(12) United States Patent
Doshi et al.

(10) Patent No.: US 7,243,171 B2
(45) Date of Patent: Jul. 10, 2007

(54) DATA FLOW MANAGEMENT APPARATUS, SYSTEMS, AND METHODS

(75) Inventors: Sachin Doshi, Bangalore (IN); Suryakant Maharana, Bangalore (IN); Raju Krishnamurthi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 10/705,315

(22) Filed: Nov. 10, 2003

(65) Prior Publication Data
US 2005/0102448 A1    May 12, 2005

(51) Int. Cl.
*G06F 13/00* (2006.01)
*G06F 9/50* (2006.01)
(52) U.S. Cl. .................. 710/56; 709/235; 370/234; 718/104
(58) Field of Classification Search .......... 710/29, 710/31, 32; 709/233
See application file for complete search history.

(56) References Cited

U.S. PATENT DOCUMENTS

| | | | | |
|---|---|---|---|---|
| 5,933,427 A | * | 8/1999 | Liang | 370/359 |
| 6,009,078 A | * | 12/1999 | Sato | 370/232 |
| 6,104,712 A | * | 8/2000 | Robert et al. | 370/389 |
| 6,678,248 B1 | * | 1/2004 | Haddock et al. | 370/235 |
| 6,785,238 B1 | * | 8/2004 | Kago | 370/236.1 |
| 2003/0064681 A1 | * | 4/2003 | Uedo | 455/3.06 |
| 2003/0067897 A1 | * | 4/2003 | Black | 370/335 |
| 2003/0123392 A1 | * | 7/2003 | Ruutu et al. | 370/235 |
| 2003/0131043 A1 | * | 7/2003 | Berg et al. | 709/104 |
| 2003/0225905 A1 | * | 12/2003 | Scifres et al. | 709/234 |

* cited by examiner

*Primary Examiner*—Ilwoo Park
(74) *Attorney, Agent, or Firm*—Schwegman, Lundberg, Woessner & Kluth, P.A.

(57) ABSTRACT

An apparatus and a system, as well as a method and an article, may operate to control a data flow associated with one of a plurality of ports sharing a resource, including a memory. The port having the controlled data flow may have an actual usage value above a determined average shared resource usage value associated with the plurality of ports.

29 Claims, 4 Drawing Sheets

```
                                                                        ,-370

⎧ PortRxUsage = Per Receive port utilization of memory
 372 ⎨  PortRxSharedUsage = (PortRxUsage > Tpmin) ? (PortRxUsage -Tpmin):0
     ⎪  CumulativeSharedUsage = SUM (PortRxSharedUsage)
     ⎩  Delta Value = Function(port speed, overall resource usage)

if (CumulativeSharedUsage is greater than a memory level for which adaptive flow
         control is enabled)
         {                      ~380
                 NumPortsInShared = count of all the ports which are using memory in shared
                                    space // Different speed ports are scaled accordingly. 10G
                                    is counted as 10 ports. This value is used to determine
                                    the average shared memory usage per 1G port.

AverageSharedUsage1G = [CumulativeSharedUsage /NumPortsInShared]
                 AverageSharedUsage10G = AverageSharedUsage1G * 10
                 DynamicThresh1G = AverageSharedUsage1G + Delta value
                 DynamicThresh10G  = AverageSharedUsage10G + Delta value
                 DynamicThresh1Gdown = DynamicThresh1G - Delta value
                 DynamicThresh10Gdown  = Dynamicthresh10G - Delta value
         }

DynamicThresh = (Portspeed == 10G) ? DynamicThresh10G : DynamicThresh1G      ⎫
         DynamicThreshdown = (Portspeed == 10G) ?                                      ⎬ 382
                                           Dynamicthreshdown10G : DynamicThreshdown1G ⎭ if (PortRxSharedUsage >= DynamicThresh)  ~384
         {// this port is consuming more than the average
                 AssertFlowControl;
                 FlowControlTime = 16'hFFFF or
                                      Function(PortRxSharedUsage - DynamicThresh)
         }
         else if (PortRxSharedUsage < DynamicThreshDown) or
                                                   (PortRxUsage <= Tpmin) ~386
         {// this port is no longer causing congestion
                 DeassertFlowControl;
         }
```

*Fig. 3*

DATA FLOW MANAGEMENT APPARATUS, SYSTEMS, AND METHODS

TECHNICAL FIELD

Various embodiments described herein relate to data processing generally, including apparatus, systems, and methods used to manage resources, such as memory.

A portion of this document contains material which is subject to copyright protection. The copyright owner has no objection to the facsimile reproduction by anyone of this document or other items including the protected material as maintained in the Patent and Trademark Office records, but otherwise reserves all rights whatsoever in this material. The following notice applies to the software and data as described below and in any drawings attached hereto: Copyright © 2003 Intel Corporation, All Rights Reserved.

BACKGROUND INFORMATION

Efficient management of resources during congested conditions can be a measure of data switch performance, especially when those resources (e.g., packet storage, transmit queue storage) are shared among multiple ports. For example, consider a switch that guarantees a minimum resource allocation per port by reserving some portion of the resource for use by each port. After reservations have been made, the remaining amount of the resource, such as a memory, may be allocated on a need-to-use basis as part of a shared resource pool.

If one of the ports begins to use resources from the shared pool (i.e., beyond the reserved portion), congestion with respect to that port may be implied. If multiple ports are using resources from the shared pool, one, some, or all of the ports might be contributing to the same congestion, or to a variety of congested situations. Thus, determining which ports might be involved in congestion at any given time can be complicated, making it difficult to balance use of the resource pool. Therefore, apparatus, systems, and methods to more efficiently manage resources in the presence of congestion are needed.

BRIEF DESCRIPTION OF THE DRAWINGS

FIG. 3 is a pseudocode listing that illustrates several methods according to various embodiments.

DETAILED DESCRIPTION

A "resource," for the purposes of this document, may include any virtual or physical item that can be shared among competing interests. For example, a resource may comprise processing time provided by a microprocessor, current provided by a power supply, queue storage provided by a memory, etc. Competing interests may include elements such as circuits, ports, programs, data sources, etc.

Many of the embodiments described herein provide resource management among competing interests that operate to balance resource usage. For example, several embodiments may balance the use of a memory pool shared by a number of ports in a data switch when congested conditions arise, and/or as congested conditions change. Some embodiments may manage resources by observing the shared usage of all ports and predicting whether such usage is a part of the congestion, or of different congestion situations. Flow control can be applied to selected ports determined to contribute to overall congestion of the shared resource. "Congestion," for the purposes of this document, may occur when a resource is utilized by a particular port to an extent that is greater than similar ports and above some specified limit. The amount of congestion may then be measured in relation to usage above some guaranteed level of resource allocation, by the kind of traffic sent/received at a port, and possibly with the assistance of internal resource usage counters.

To determine which ports are contributing to congestion, an "average value" of the shared resource used among the contributing ports may be determined. Based on whether a selected port is above or below the determined average value, that port may be flow-controlled, or flow control may be removed, respectively. The determined average value may be updated as ports are added and deleted from using the shared resource. Flow control may be effected by any number of handshaking mechanisms known to those of skill in the art, including the use of various standards, such as the IEEE 802.3x series of standards. For more information regarding the various IEEE 802.3 standards, please see the Institute of Electrical and Electronics Engineers (IEEE) 802.3, 2000 Edition, IEEE Standard for Information Technology—Telecommunications and information exchange between systems—local and metropolitan area networks—specific requirements—Part 3: Carrier Sense Multiple Access with Collision Detection Access Method and Physical Layer Specifications, and related versions.

Figure 1:
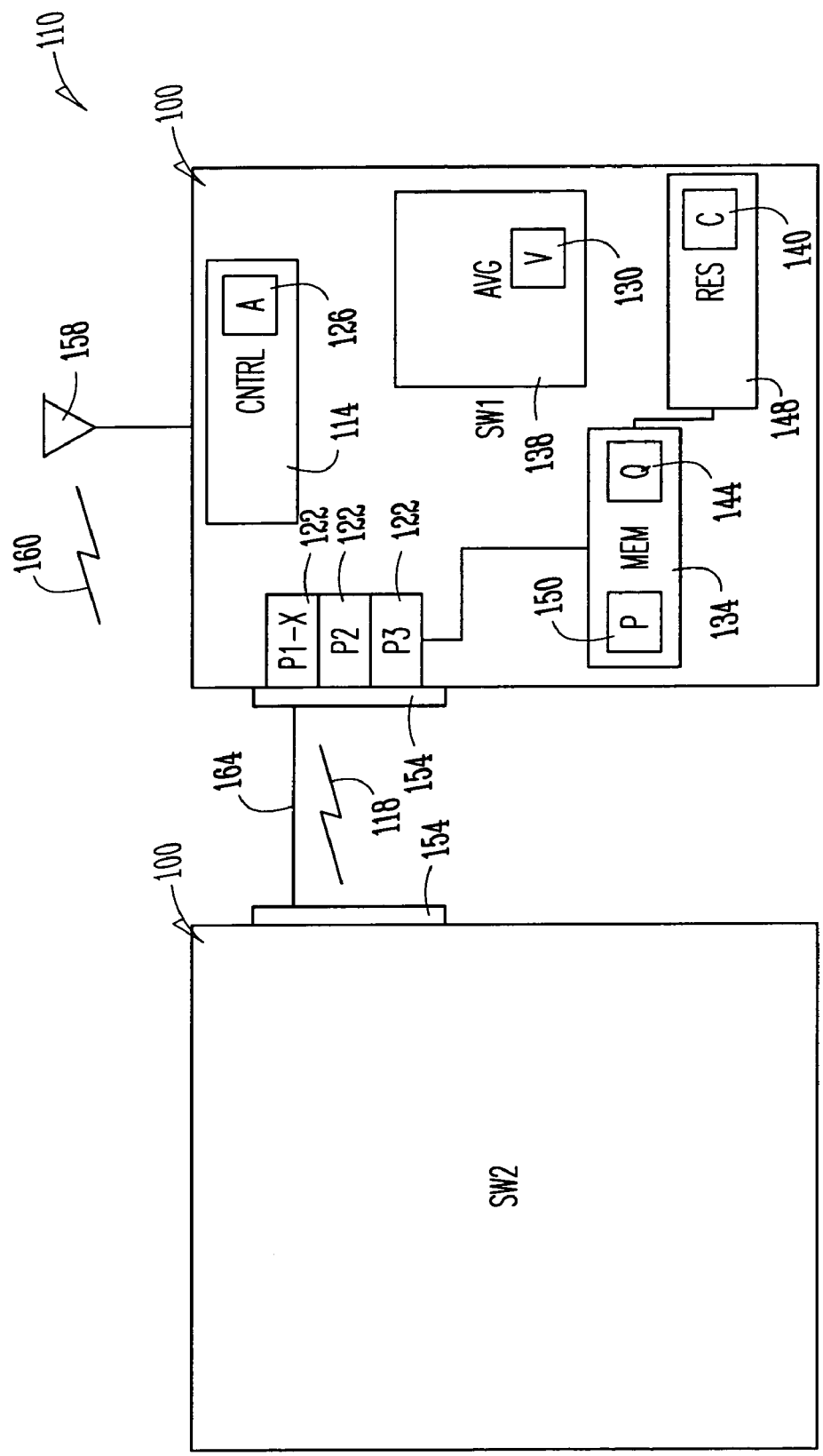
FIG. 1 is a block diagram of an apparatus and a system according to various embodiments.

FIG. 1 is a block diagram of an apparatus 100 and a system 110 according to various embodiments, each of which may operate in the manner described above. For example, an apparatus 100 may comprise a controlling module 114 to control a data flow 118 associated with one or more selected ports 122 having an actual usage value 126 above a determined average shared resource usage value 130 associated with the ports P1, P2, and P3 sharing a resource 134, such as a memory. The number of ports 122 may be selected as those ports that have exceeded a minimum guaranteed resource limit. The data flow 118 may be organized as bits, bytes, words, packets, and/or frames. Packets may be formatted as Ethernet packets. For more information regarding the Ethernet standard, please see the IEEE 802.3x series of standards, referenced above.

The apparatus 100 may include an average determination module 138 to determine the determined average shared resource usage value 130, which may be found by determining a cumulative shared usage value 140 based on a selected number of ports 122 (e.g., three, as shown in FIG. 1) and dividing the cumulative shared usage 140 value by the selected number of ports 122. The cumulative shared usage value 140 may be determined by summing the amount of the resource 134 used that is greater than a guaranteed minimum amount over the selected number of ports 122.

Given the broad definition of a resource given above, many embodiments may be realized. For example, an apparatus 100 may include a memory 134 having a transmit queue storage 144, a plurality of ports 122 coupled to the memory 134, and a reservation module 148 coupled to the ports 122 to provide a minimum memory resource per port P1, P2, and P3, and to share any remaining memory resource among the plurality of ports 122.

The apparatus 100 may also have an average determination module 138 to determine a determined average shared resource usage value 130 as the minimum memory resource value guaranteed per port P1, P2, and P3. The apparatus 100 may also include a controlling module 114 to control the data flow 118 associated with one (or more) of the plurality of ports 122 having an actual usage value above the determined average shared resource usage value. For example, as shown in FIG. 1, P1 may be congested, and have an actual usage value 126 above the determined average shared resource usage value 130. In this case, flow control may be applied to port P1, but not to ports P2 and P3. In some embodiments, the memory 134 may be used to store a plurality of packets 150, possibly in a transmit storage queue 144. The determined average shared resource usage value may be determined as described above. The controlling module 114 may comprise a network processor, including network processors similar to or identical to an Intel® IXP2400 network processor. The apparatus 100 may also comprise a Layer 2 (or higher level) Ethernet switch, similar to or identical to a D-Link DES-3226S Layer 2 switch, available from D-Link of Taipei, Taiwan. For more information regarding the Ethernet standard, please see the IEEE 802.3x series of standards, referenced above.

In another embodiment, a system 110 may comprise an apparatus 100 as described above, as well as a connector 154 including at least one of the ports 122. The system 110 may also include an antenna 158, such as a monopole, dipole, patch, or omnidirectional antenna to receive information 160 included in the data flow 118, as well as a memory 134 coupled to one or more of the ports 122. As is the case with the apparatus 100, the memory 134 may comprise a transmit queue storage 144. The system 110 may also comprise a communications medium 164, such as a fiber optic cable, an electrical conductor, or even a carrier wave to communicate the data flow 118 with apparatus 100 and other elements.

The apparatus 100, system 110, controlling module 114, data flow 118, ports 122, actual usage value 126, determined average shared resource usage value 130, resource 134, average determination module 138, cumulative shared usage value 140, transmit queue storage 144, reservation module 148, packets 150, connector 154, antenna 158, information 160, and communications medium 164 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100 and the system 110, and as appropriate for particular implementations of various embodiments.

It should also be understood that the apparatus and systems of various embodiments can be used in applications other than for computers, and other than for systems that include wireless data communications, and thus, various embodiments are not to be so limited. The illustrations of an apparatus 100 and a system 110 are intended to provide a general understanding of the structure of various embodiments, and they are not intended to serve as a complete description of all the elements and features of apparatus and systems that might make use of the structures described herein.

Applications which may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as subcomponents within a variety of electronic systems, such as televisions, cellular telephones, personal computers, workstations, radios, video players, vehicles, and others.

Figure 2:
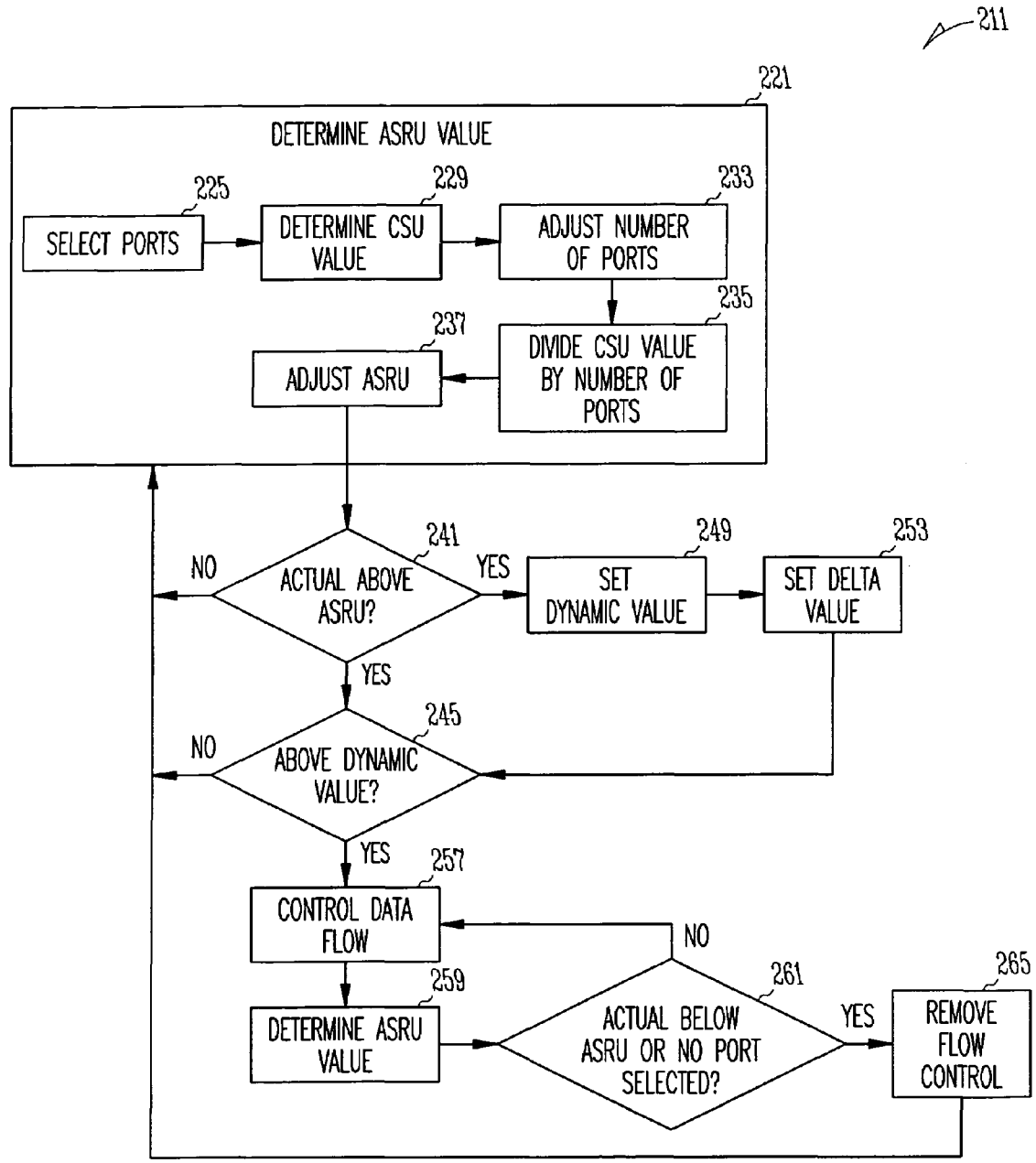
FIG. 2 is a flow chart illustrating several methods according to various embodiments.

FIG. 2 is a flow chart illustrating several methods according to various embodiments. A method 211 may (optionally) begin with determining a determined average shared resource usage value at block 221, which may in turn comprise selecting a number of ports (e.g., a group of ports) by locating a plurality of ports including at least one port using an amount of the resource greater than a guaranteed minimum amount at block 225, determining a cumulative shared usage value based on the selected number of ports sharing the resource at block 229, and adjusting the selected number of ports to provide a scaled selected number of ports at block 233. The cumulative shared usage value may be determined by summing the amount of the resource used that is greater than a guaranteed minimum amount over the number of ports in the selected group.

The determined average shared resource usage value associated with the selected number of ports may be determined repeatedly, and adjusted as desired. The determined average shared resource usage value may also be implemented as a dynamically changing value, as described below.

The method 211 may also include determining the determined average shared resource usage value by dividing the cumulative shared usage value by the selected number of ports sharing the resource, such as a memory, at block 235. Similarly, the method 211 may include adjusting the determined average shared resource usage value to provide a scaled average shared resource value based on port speeds of selected ports within the selected group at block 237. The scaled selected number of ports may be based on port speeds (or determined as a function of actual port data rates, if known) for various selected ports within the group of ports. For example, within a selected group of ports, the scaled selected number of ports may be based on a port speed associated with a first port (e.g., 1 Gbit) and a port speed associated with a second port (e.g., 10 Gbit). The process of scaling will be explained in further detail hereinbelow.

The method 211 may continue at block 241 with determining whether one or more ports in a selected group of ports has an actual resource usage value above the determined average shared resource usage value associated with the selected group of ports (sharing a resource). If so, then the method 211 may also include controlling the data flow associated with one or more of the selected group of ports that has an actual usage value above a dynamic threshold value if it is determined that the actual usage value is above the dynamic threshold value at block 245.

The method 211 may include setting the dynamic threshold value as a sum of the determined average shared resource usage value and a delta value at block 249, which may in turn be determined or set according to the port speed and an overall resource usage value including a cumulative shared usage value based on the number of ports in the group at block 253.

Thus, the method 211 may include controlling a data flow associated with at least one of a selected number of ports having an actual usage value above a determined average shared resource usage value (associated with the selected group of ports sharing a resource) at block 257, and then determining the determined average shared resource usage value at block 259. The process executed at block 259 may be similar to or identical to the process shown for block 221, and described above. If it is determined that one of the ports in a selected group has an actual usage value below the determined average shared resource usage value at block 261 (or one of the ports is no longer selected), then the control on the data flow associated with that port may be removed at block 265. If the actual usage value for that port is not less than the determined average shared resource usage value at block 261, then flow control will continue to be imposed on that port at block 257. Otherwise, the method 211 may continue with determining the determined average shared resource usage value at block 221.

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment, including Hypertext Markup Language (HTML) and Extensible Markup Language (XML).

Thus, other embodiments may be realized. FIG. 3 is a pseudocode listing 370 that illustrates several methods according to various embodiments. In the initial section 372, several variables are initialized. PortRxUsage is the actual usage value of a memory resource by a selected port. The code "PortRxSharedUsage=(PortRxUsage>Tpmin)?(PortRxUsage−Tpmin): 0" determines whether the selected port is using more than the minimum guaranteed resource limit (i.e., Tpmin). The Value CumulativeSharedUsage is the sum of PortRxSharedUsage over all of the ports in a selected group.

The Delta Value may be set as a function of port speed and overall resource usage, designed to impose some amount of hysteresis about the determined average shared resource usage value. This helps to apply flow control smoothly when the determined average shared resource usage value changes, and, as the resource is equally consumed by all ports in the selected group, more and more of the resource may be allowed to be consumed until the overall resource usage is relatively high, such that the delta value tends toward zero.

At line 380, if the value of CumulativeSharedUsage is greater than a memory usage level for which adaptive flow control is enabled, then the number of ports using the resource above the minimum value are counted as NumPortsInShared, and scaled if desired. For example, assuming all ports are 1 Gbit ports, then the value of AverageSharedUsage for each 1 Gbit port may be set to [CumulativeSharedUsage/NumPortsInShared]. A 10 Gbit port may be counted as ten 1 Gbit ports. Thus, the value of AverageSharedUsage for each 10 Gbit port may be set to the value of AverageSharedUsage for a 1 Gbit port times ten.

As noted previously, dynamic thresholds may be used. The dynamic threshold for a 1 Gbit port may be set as DynamicThres1G, or the value of AverageSharedUsage for a 1 Gbit port plus a selected delta value. For a 10 Gbit port, the dynamic threshold may be set as DynamicThres10G, or the AverageSharedUsage value for a 10 Gbit port plus the selected delta value. Another threshold, that at which flow control may be removed, may also be set as a dynamic value. For example, the value DynamicThresh1Gdown for a 1 Gbit port may be set as the value of the DynamicThresh1G minus the selected delta value. Similarly, the value DynamicThresh10Gdown for a 10 Gbit port may be set as the value of the DynamicThresh10G minus the selected delta value.

At line 382, appropriate dynamic threshold levels may be selected. For example, if the port is a 10 Gbit port, then the flow control assertion dynamic threshold DynamicThresh10G may be selected. Otherwise the dynamic threshold for a 1 Gbit port (e.g., DynamicThresh1G) may be selected. Similarly, if the port is a 10 Gbit port, then the flow control de-assertion threshold DynamicThresh10Gdown may be selected. Otherwise the dynamic threshold for a 1 Gbit port (e.g., DynamicThresh1Gdown) may be selected.

At line 384, it can be seen that if the value of PortRxSharedUsage greater than or equal to DynamicThresh (i.e., the upper dynamic threshold), then the selected port is consuming more than the determined average shared resource usage value. Flow control may then be asserted for that port, either for a fixed time, or as some function of the deviation above the hysteresis band fixed by the dynamic threshold.

At line 386, it can be seen that if the value of PortRxSharedUsage is less than DynamicThreshDown (i.e., the lower dynamic threshold) for the selected port, then this port is not causing congestion, and flow control can be removed, or de-asserted.

Figure 4:
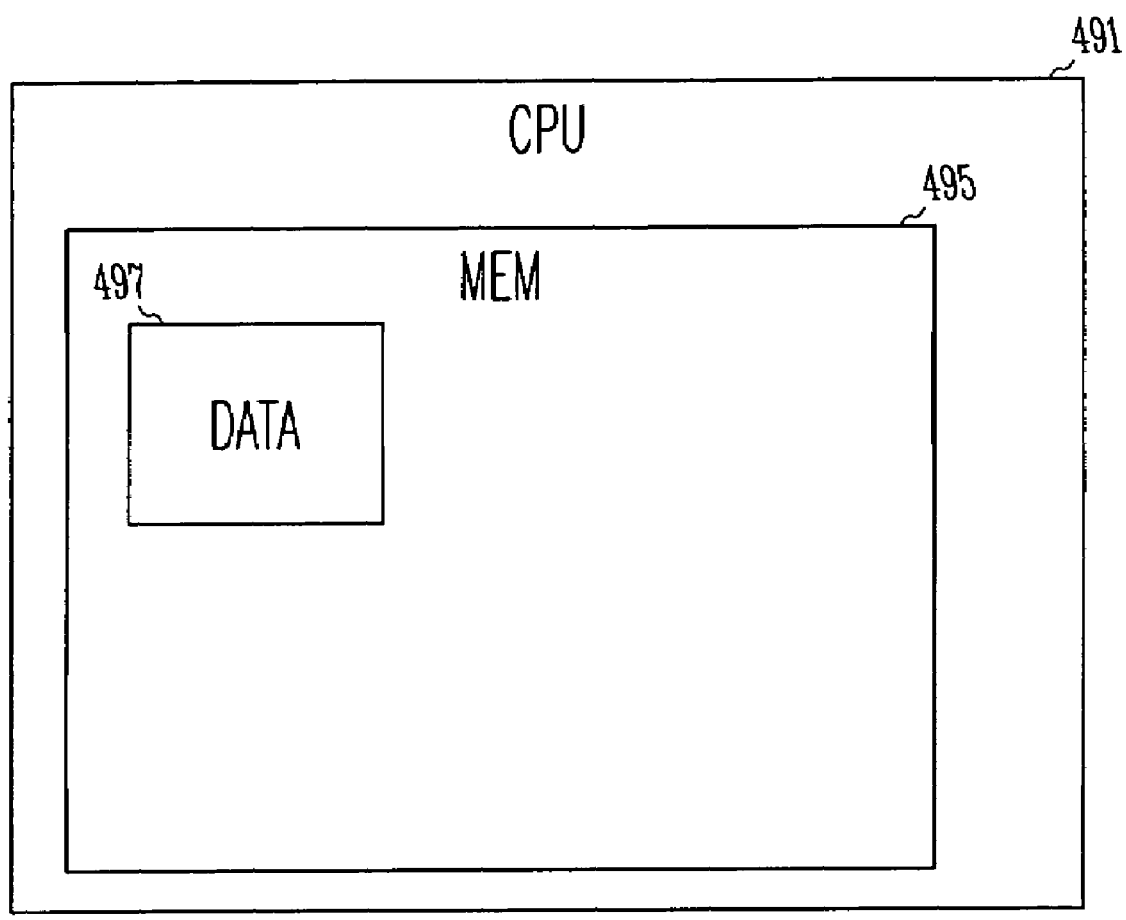
FIG. 4 is a block diagram of an article according to various embodiments.

Still further embodiments may be realized. For example, FIG. 4 is a block diagram of an article 491 according to various embodiments, such as a computer, a memory system, a magnetic or optical disk, some other storage device, a data switch (including an Ethernet Layer 2 switch), and/or any type of electronic device or system. The article 491 may comprise a machine-accessible medium such as a memory 495 (e.g., a memory including an electrical, optical, or electromagnetic conductor) having associated data 497 (e.g., computer program instructions), which when accessed, results in a machine performing such actions as controlling a data flow associated with at least one of a selected number of ports (e.g., one or more of a selected group of ports) having an actual usage value above a determined average shared resource usage value. As noted previously, the determined average shared resource usage value is typically associated with the selected number, or group, of ports sharing the same resource. Also, as noted previously, the data flow associated with a selected port may be controlled if the actual usage value is above a dynamic threshold value.

Other activities may include determining the determined average shared resource usage value, which may in turn include selecting the selected number of ports by locating a plurality of ports including at least one port using an amount of the resource (e.g., a memory) greater than a guaranteed minimum amount, determining a cumulative shared usage value based on the selected number of ports, and determining the determined average shared resource usage value by dividing the cumulative shared usage value by the selected number of ports. Determining the cumulative shared usage value may comprise summing the amount of the resource used that is greater than a guaranteed minimum amount over the selected number of ports.

Determining the determined average shared resource value may also include adjusting the determined average shared resource usage value to provide a scaled average shared resource value. The scaled average shared resource value may be based on a port speed associated with a first port and a port speed associated with a second port (e.g., a 1 Gbit port and a 10 Gbit port), wherein the first port and the second port are included in the number of ports. Thus, further activities may include setting a dynamic threshold value as a sum of a scaled average shared resource usage value and a delta value.

Improved resource management during congested conditions may result from implementing various embodiments described herein. Resources consumed by a selected congested port may be allowed to depend on the congestion status of other ports. If multiple ports contribute to the same congestion, they may be allowed to share resources in a more equal fashion. For conditions where more than one source of congestion exists, resources may be more equally distributed among the sources of congestion, such that higher resource utilization may be realized.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
controlling a data flow associated with at least one of a selected number of ports having a first actual usage value above a determined average shared resource usage value associated with the selected number of ports sharing a resource, wherein the selected number of ports each use an amount of the resource greater than a guaranteed minimum amount of the resource, and wherein determining the determined average shared resource usage value comprises selecting the selected number of ports by locating at least one port included in a plurality of ports using the amount of the resource greater than the guaranteed minimum amount, determining a cumulative shared usage value based on the selected number of ports, and determining the determined average shared resource usage value by dividing the cumulative shared usage value by the selected number of ports.

2. The method of claim 1, further comprising:
determining the determined average shared resource usage value.

3. The method of claim 1, further comprising:
removing a control on the data flow associated with the at least one of the selected number of ports after the at least one of the selected number of ports is determined to have a second actual usage value below the determined average shared resource usage value.

4. The method of 1, further comprising:
adjusting the selected number of ports to provide a scaled selected number of ports based on a port speed associated with a first port and a port speed associated with a second port, wherein the first port and the second port are included in the selected number of ports.

5. The method of claim 1, further comprising:
repeatedly determining the determined average shared resource usage value associated with the selected number of ports.

6. The method of claim 1, wherein controlling the data flow further comprises:
controlling the data flow associated with the at least one of the selected number of ports having the first actual usage value above a dynamic threshold value.

7. The method of claim 6, further comprising:
setting the dynamic threshold value as a sum of the determined average shared resource usage value and a delta value.

8. The method of claim 7, further comprising:
determining the delta value according to a port speed and an overall resource usage value including a cumulative shared usage value based on the selected number of ports.

9. The method of claim 1, wherein the resource comprises a memory.

10. An article comprising a machine-accessible medium having associated data, wherein the data, when accessed, results in a machine performing:
controlling a data flow associated with at least one of a selected number of ports having an actual usage value above a determined average shared resource usage value associated with the selected number of ports sharing a resource, wherein the selected number of ports each use an amount of the resource greater than a guaranteed minimum amount of the resource, and wherein determining the determined average shared resource usage value comprises selecting the selected number of ports by locating at least one port included in a plurality of ports using the amount of the resource greater than the guaranteed minimum amount, determining a cumulative shared usage value based on the selected number of ports, and determining the determined average shared resource usage value by dividing the cumulative shared usage value by the selected number of ports.

11. The article of claim 10, wherein the data, when accessed, results in the machine performing:
determining the determined average shared resource usage value.

12. The article of claim 10, wherein the data, when accessed, results in the machine performing:
adjusting the determined average shared resource usage value to provide a scaled average shared resource value based on a port speed associated with a first port and a port speed associated with a second port, wherein the first port and the second port are included in the number of ports.

13. The article of claim 10, wherein controlling the data flow further comprises:
controlling the data flow associated with the at least one of the selected number of ports having the actual usage value above a dynamic threshold value.

14. The article of claim 13, wherein the data, when accessed, results in the machine performing:
setting the dynamic threshold value as a sum of a scaled average shared resource usage value and a delta value.

15. The article of claim 10, wherein the resource is a memory.

16. The article of claim 10, wherein determining the cumulative shared usage value comprises:
over the selected number of ports, summing the amount of the resource used that is greater than the guaranteed minimum amount.

17. An apparatus, comprising:
a controlling module hardware to control a data flow associated with at least one of a selected number of ports having an actual usage value above a determined average shared resource usage value associated with the selected number of ports sharing a resource, wherein the selected number of ports each use an amount of the resource greater than a guaranteed minimum amount of the resource, and wherein determining the determined average shared resource usage value comprises selecting the selected number of ports by locating at least one port included in a plurality of ports using the amount of the resource greater than the guaranteed minimum amount, determining a cumulative shared usage value based on the selected number of ports, and determining the determined average shared resource usage value by dividing the cumulative shared usage value by the selected number of ports.

18. The apparatus of claim 17, further comprising:
an average determination module to determine the determined average shared resource usage value.

19. The apparatus of claim 17, wherein the cumulative shared usage value is determined by summing, over the selected number of ports, the amount of the resource used that is greater than the guaranteed minimum amount.

20. The apparatus of claim 17, wherein the controlling module hardware comprises a network processor.

21. The apparatus of claim 17, further comprising:
a Layer 2 Ethernet switch.

22. An apparatus, comprising:
a memory having a transmit queue storage;
a plurality of ports coupled to the memory;
a reservation module coupled to the plurality of ports to provide a minimum memory resource per port and to share a remaining memory resource among the plurality of ports using more than the minimum memory resource;
an average determination module to determine a determined average shared resource usage value greater than the minimum memory resource; and
a controlling module to control a data flow associated with at least one of the plurality of ports having an actual usage value above the determined average shared resource usage value.

23. The apparatus of claim 22, wherein average determination module is to determine the determined average shared resource usage value by determining a cumulative shared usage value based on the plurality of ports and dividing the cumulative shared usage value by the plurality of ports.

24. The apparatus of claim 22, wherein the memory is to store a plurality of packets in the transmit queue storage.

25. A system, comprising:
a controlling module to control a data flow associated with at least one of a selected number of ports having a first actual usage value above a determined average shared resource usage value associated with the selected number of ports sharing a resource, wherein the selected number of ports each use an amount of the resource greater than a guaranteed minimum amount of the resource, and wherein determining the determined average shared resource usage value comprises selecting the selected number of ports by locating at least one port included in a plurality of ports using the amount of the resource greater than the guaranteed minimum amount, determining a cumulative shared usage value based on the selected number of ports, and determining the determined average shared resource usage value by dividing the cumulative shared usage value by the selected number of ports; and
a connector including at least one of the selected number of ports.

26. The system of claim 25, further comprising:
an omnidirectional antenna to receive information included in the data flow.

27. The system of claim 25, further comprising:
a memory coupled to the selected number of ports.

28. The system of claim 27, wherein the memory comprises a transmit queue storage.

29. The system of claim 25, further comprising:
a communications medium to couple to the connector.

* * * * *